United States Patent [19]
Meyer et al.

[11] Patent Number: 5,236,017
[45] Date of Patent: Aug. 17, 1993

[54] DISTRIBUTING VALVE OF MODULAR CONSTRUCTION

[75] Inventors: Ernst-August Meyer, Wennigsen; Werner Dannenberg, Hemmingen; Johannes Thomas, Gehrden; Achim Krafft, Hanover; Manfred Schmitz, Garbsen, all of Fed. Rep. of Germany

[73] Assignee: Mannesmann Aktiengesellschaft, Dusseldorf, Fed. Rep. of Germany

[21] Appl. No.: 803,599

[22] Filed: Dec. 9, 1991

[30] Foreign Application Priority Data

Dec. 7, 1990 [DE] Fed. Rep. of Germany ....... 4039564

[51] Int. Cl.$^5$ ........................................... F15B 13/042
[52] U.S. Cl. ......................... 137/625.66; 137/625.25; 137/884
[58] Field of Search ..................... 137/625.25, 625.66, 137/884

[56] References Cited

U.S. PATENT DOCUMENTS

| | | | |
|---|---|---|---|
| 3,587,647 | 6/1971 | Walters | 137/625.25 |
| 3,680,593 | 8/1972 | Sorenson | 137/625.64 X |
| 3,934,605 | 1/1976 | Legris | 137/884 X |
| 4,515,184 | 5/1985 | Bownass et al. | 137/625.66 |
| 4,587,991 | 5/1986 | Chorkey | 137/625.66 X |
| 4,627,462 | 12/1986 | Lyons | 137/625.66 X |
| 4,838,312 | 6/1989 | Berchem et al. | 137/625.25 X |

FOREIGN PATENT DOCUMENTS

| | | |
|---|---|---|
| 0093359 | 11/1983 | European Pat. Off. . |
| 0108951 | 5/1984 | European Pat. Off. . |
| 0121849 | 10/1984 | European Pat. Off. . |
| 0198234 | 10/1986 | European Pat. Off. . |
| 1915966 | 10/1969 | Fed. Rep. of Germany . |
| 2095795 | 10/1982 | United Kingdom . |

Primary Examiner—Gerald A. Michalsky
Attorney, Agent, or Firm—Cohen, Pontani, Lieberman, Pavane

[57] ABSTRACT

A modular distributing valve includes a valve body within which an actuating member is displaceably arranged along a longitudinal axis of the valve body. A pair of control housings lying opposite each other on the axis for actuating the actuating member are arranged in the valve body. The valve body is a tub-shaped base body which can be closed by a flat cover and is provided with ISO gas connection openings on the side opposite the cover. In order to achieve ease of assembly and eliminate the need for sealing elements around the actuating member and the switched fluid paths in the modular distributing valve, the control housings are detachably connected to the cover and are inserted with a mechanical interference fit forming a seal and fixed in place in the valve body, together with the actuating member, from the side of the valve body opposite the gas connections.

10 Claims, 3 Drawing Sheets

DISTRIBUTING VALVE OF MODULAR CONSTRUCTION

FIELD OF THE INVENTION

The invention relates to a modular distributing valve including of an actuating member which is displaceably arranged along an axis, inside of a valve body and of a pair of control portions lying opposite each other on the axis for actuating the actuating member. The valve body is a tub-shaped base body which forms a closed space when covered by a flat cover, and is provided with ISO standard gas connection openings on the side opposite the cover.

BACKGROUND OF THE INVENTION

A distributing valve of the above-mentioned type is known from EP 0,093,359 A1 which is incorporated herein by reference. In EP 0,093,359 A1, the distributing valve consists of a valve body, within which a displaceable actuating member is arranged along an axis thereof, and which can be actuated by displacement of the member by a pair of housings for the control apparatus located opposite each other, with respect to the axis of the valve body. The valve body consists of a tub-shaped housing which can be closed with a flat cover. The body is provided with ISO standard gas connection ports on the side opposite the cover, i.e., the bottom. The control housings of EP 0,093,359 A1, however, lie outside the tub-shaped valve body. This has the disadvantage that the control housings must be mounted separately and, in this connection, also suitably separately sealed. The actuating member of EP 0,093,359 A1 is a longitudinally moveable control slide, which is guided in a multipartite slide bushing within the housing. The multipartite structure in the region of the valve body, which guides the actuating member, increases the cost of assembly of the valve.

Another distributing valve is known from EP 0,134,185 which is incorporated herein by reference. The distributing valve of EP 0,134,185 consists of a valve-body housing containing a plurality of valve chambers, spaced parallel to each other in a lateral direction. These valve chambers are formed from segments, which can be joined together, and each of which is provided with an opening. The openings are aligned with a common axis which forms the axis of movement of the moveable valve member guided in the valve chambers. A pair of control housings lie opposite each other with respect to the axis, facing outward in axial direction. The valve member is, in this case, actuated via the control housings by displacement in an axial direction into the desired positions.

The valve member itself in EP 0,134,185 consists of a bar having radial symmetry, which is tapered in various sections so that a gas is passed or blocked between the valve chambers depending on the position of the valve member. The valve member resides in a valve body housing with valve chambers and control housings, which is assembled with screws onto a valve base plate. The critical sealing surfaces, including the sealing surface between the valve member and the valve chambers and the sealing surface of the entire valve-chamber system, are formed by individual sealing elements or sealing rings. This has the disadvantage that the valve consists of a plurality of individual elements, which makes both assembly and maintenance especially difficult and time consuming.

Another valve is known from Federal Republic of Germany DE-OS 1,915,966, which is incorporated herein by reference. In DE-OS 1,915,966, the valve consists of a coherent valve body which has valve chambers and within which there is an opening which extends axially through all of the valve chambers. A valve member having radial symmetry is displaceably guided through this opening. This arrangement, however, makes it difficult to obtain a suitable seal between the individual regions of the valve member and the valve chambers. The valve body is, in this case, fastened on a base body having suitable gas connections. A partially surrounding protective hood is connected over the assembly consisting of the valve body and the base body. This has the disadvantage that the control housings which actuate the valve member are arranged outside of the protective hood, and as a result of which the entire valve is more difficult to handle upon assembly.

OBJECTS OF THE INVENTION

It is an object of the present invention to create a distributing valve which can be simply and rapidly installed and which eliminates the need for sealing elements in the region of the actuating member and of the fluid paths to be switched.

It is a further object of the present invention to provide a modular distributing valve having a hollow valve body having an open side, a bottom having gas connection ports, two side walls, two end walls and an axis, a cover, for covering the open side and enclosing a space of said hollow valve body, an actuating member, displaceably located within said valve body along said axis, and a housing for a control means disposed on said axis, for displacing said actuating member along said axis, detachably connected to said cover, which can be inserted with an interference fit and positioned together with said actuating member in said valve body from said open side of said hollow valve body. A pair of complementary housings for the control means may be present.

It is a further object of the present invention to provide a distributing valve having a ceramic plate which is displaceably fixed with respect to said actuating member, having valve chambers formed on the side facing said gas connection ports.

It is a further object of the present invention to provide a distributing valve having a seal between said actuating member and said valve body, formed from mating polished ceramic surfaces.

It is also an object of the present invention to provide a distributing valve having aligned apertures extending through said cover and said valve body, through which fastening means may be inserted for fastening said distributing valve an ISO standard base plate.

Another object of the present invention is to provide a channel in said cover through which a fluid may pass, extending in said cover along an axis generally parallel to said axis of said valve body, which terminates at an end of said cover in a connection socket which is adapted to detachably mount said housing of said control means to said cover.

It is another object of the present invention to provide a distributing valve with two actuating housings, having a piston and an associated corresponding cylinder space formed in each actuating housing, wherein both of said cylinder spaces of said housings of said control means are adapted to be connected to said channel through said connection sockets of said cover.

It is another object of the present invention to provide a distributing valve wherein said housings of said control means have an upper surface and said cover has an upper surface, whereby when said control means and said cover are mounted in said valve body, said upper surface of said cover and said upper surfaces of each of said control means are generally coplanar.

It is a still further object of the invention to provide a distributing valve wherein said housing of said control means has a guide web aligned generally parallel to a direction of insertion of said housing of said control means in said valve body and said valve body has a corresponding slot for flushly receiving said guide web along said direction of insertion, so that said housing of said control means is guided into said valve body by said guide wed and said corresponding slot during assembly of said distributing valve, and forms a seal.

It is still another object of the present invention to provide a distributing valve having a flat roller bearing disposed between said actuating member and said cover.

SUMMARY OF THE INVENTION

The present invention provides a modular distributing valve in which the control means are detachably connected to the cover, forming a seal, and are inserted and held in place in form-locked manner, i.e., fixed in place by the mechanical interference of pressing of two surfaces against each other generally normal to the forces exerted. The valve body has an opening on the side lying opposite the gas connections, through which the actuating member is inserted. This structure leads to a number of advantages.

A first advantage of the present invention is that all of the essential elements of the valve are arranged in a closed coherent body of the valve. In the present invention this can be done in advantageous fashion as a result of the tub-shape of the valve body, so that it is possible to dispense with an additional housing. The control means which are customarily attached externally to the valve body, are integrated in the valve body of the present invention.

A second advantage of the present invention is that the number of elements to be mounted or installed is minimized, so that the essential valve elements can be inserted accurately and very rapidly.

The arrangement of the valve chambers within the actuating member of a preferred embodiment of the present invention leads to the advantage, as compared with the prior art, that it is possible to eliminate the need for a plurality of seals wi within the chamber system of the valve body.

In accordance with another preferred embodiment, in order to achieve a tightly sealed closure between actuating member and valve body having simple structure and assembly, the surfaces are formed of a polished ceramic material, which have a flat, smooth surface.

In accordance with another advantageous feature of the present invention, in order to obtain a permanent tight closure after mounting, the valve is provided with bore holes which extend through both the cover and the valve body, as a result of which, the valve can be connected to an ISO standard base plate while the fastening of the cover in the direction of the actuating member, to apply pressure to the surfaces to be sealed, can be effected in an advantageously simple manner.

The present invention provides an arrangement in which an axially extending pressurized fluid, e.g., a pneumatic or hydraulic channel passes within the cover, and is provided with connection sockets or ports at the axially emerging locations. This arrangement is advantageous because the control means are supplied via an integrated pressurized fluid line and, and, at the same time, are detachably connected by the location of connection sockets with the cover. This leads to an assembly which can be easily handled. The cylinder spaces within the control means can thus be easily supplied with pressurized fluids. The distributing valve of the present invention is preferably used in pneumatic systems, but may also be used in hydraulic systems.

In accordance with another preferred embodiment of the present invention, in order to obtain a good connection between housings of the control means and the cover, the connecting sockets are correspondingly located on each. In this way, the assembled valve has a flat surface without edges or steps within the region of the cover.

In order to facilitate the assembly and to allow for the accurate placement of the individual valve elements during the assembly, the control means are provided, in accordance with a preferred embodiment of the present invention, on the sides facing axially outward with, in each case, a guide web or protrusion which extends in the direction of insertion. Corresponding to these guide webs or protrusions, the valve body has recesses or slots for receiving the corresponding guide webs or protrusions. This interlocking structure allows for the accurate positioning of the individual valve elements within the structure. This accurate positioning is particularly important in the valve of the present invention because a sufficiently good seal must be obtained in the region of the actuating member and the valve body, solely by means of ceramic sealing surfaces, in order to avoid the use of separate seals. Thus, when assembled, the ceramic sealing surfaces are flush and provide a superior seal. The arrangement of the guide webs or protrusions and of the recesses, furthermore, permits rapid and reliable assembly.

Another preferred embodiment of the present invention provides a flat roller bed bearing surface on the inner side of the cover, which rests against the displaceable actuating member. This roller bed, in combination with a set of rollers or bearings associated with the actuating member, results in an actuating member which is easily and dependably moved (e.g. low friction and reduced stiction) and, thus, also allows for a reduced response time of the valve.

As a whole, the distributing valve of the present invention results in simple handling during assembly and installation and, as a result of its simple and reduced wear design, assures reliable operation and long life.

BRIEF DESCRIPTION OF THE DRAWINGS

The invention will now be described in detail with respect to the figures in the drawings, in which.

DETAILED DESCRIPTION OF THE PREFERRED EMBODIMENTS

Figure 1:
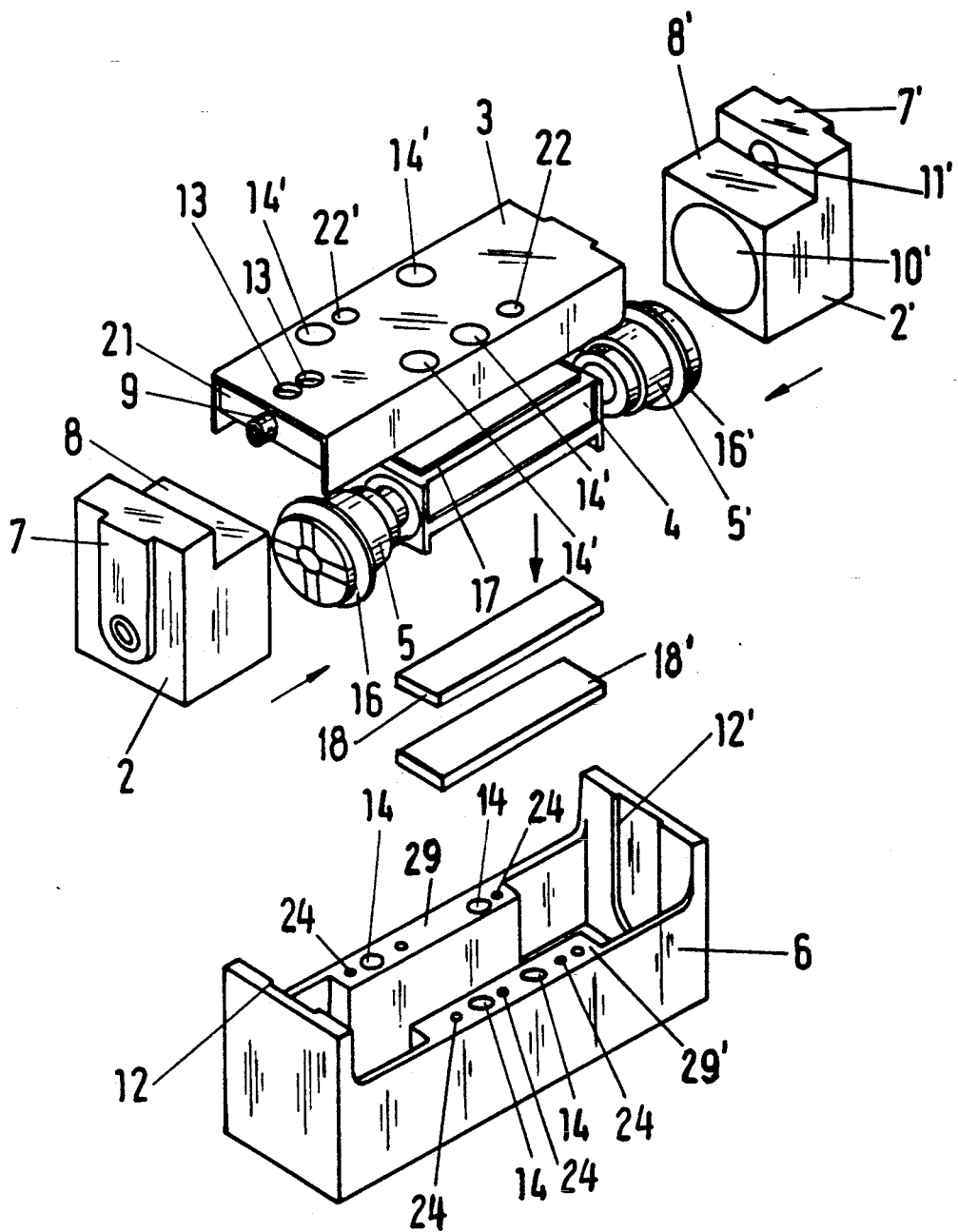
FIG. 1 is an exploded isometric view of a distributing valve of the present invention.

FIG. 1 shows the arrangement of the individual valve elements indicating the method of assembly of the individual parts into the complete assembly, as indicated by the arrows. The first step in assembly is that the entire valve package consisting of ceramic plates 18, 18' (FIGS. 1 and 2) which together form the corresponding sealing surfaces, actuating member 4 and roller bed 17 are loosely stacked in the valve body 6, which has a bottom, two sides, two ends, and an open top.

The next assembly step introduces the two pistons 5 and 5', together with seals 16 and 16', into the control housings 2 and 2'. The connecting sockets 9 and 9' are arranged on the narrow sides of the cover 3, of which only the connecting socket 9 is visible in FIG. 2. The connecting socket 9' is in a corresponding position on the opposite side of the cover 3. In the subsequent assembly step, the control housings 2 and 2' are brought against these ends or narrow sides of the cover 3 until the surfaces 21 and 21' on the cover 3 rest, in complementary fashion, against the surfaces 8 and 8' on the control housings 2 and 2'. When the surfaces 8, 8' and 21, 21' are brought to rest properly against each other, the connecting sockets 9 and 9' extend tightly into the bore holes 11 and 11' in the control housings 2 and 2' and also hold the control housings 2, 2' on the valve cover 3. Thus, the cover 3 and the control housings 2, 2' are held in fixed relation by the mechanical fit of the connecting sockets 9, 9' in the bore holes 11, 11'.

In the final assembly step, the control housings 2 and 2' are then brought, together with the connected valve cover 3, into the valve body 6, with the control housings 2, 2' and pistons 5, 5' on either side of the actuating member 4. This assembly step is facilitated by the fact that the control housings 2 and 2' are provided with guide webs 7 and 7' on the corresponding outwardly facing surfaces. The valve body 6 is provided on the corresponding end sides with recesses 12 and 12' which flushly receive the guide webs 7, 7', so that there is small clearance, thus accurately positioning the control housings 2, 2' with respect to the valve body 6. The preassembled elements are then inserted in the stacked valve package, so that the actuating member 4 together with the ceramic plates 18, 18' and the sealing surfaces rest tightly against the gas connection openings 19. The side walls of the valve body 6 are, in this connection, thickened in the region of the actuating member 4 so that the holes 14 and 22, 22' and 24 and 24', which are aligned with the cover 3, can be arranged there, without substantially impairing the function of the valve. Via the holes 14 in the valve body 6 and corresponding holes 14' in the cover 3, the entire valve can be connected to an ISO standard base plate. The channel 15 is provided with compressed air through the openings 24 and 24'. The fact that the pistons 5 and 5' are not firmly held in place or attached by locking to the actuating member 4 further facilitates assembly, since the pistons can be installed independently of the actuating member 4, which is articulated thereby.

Figure 2:
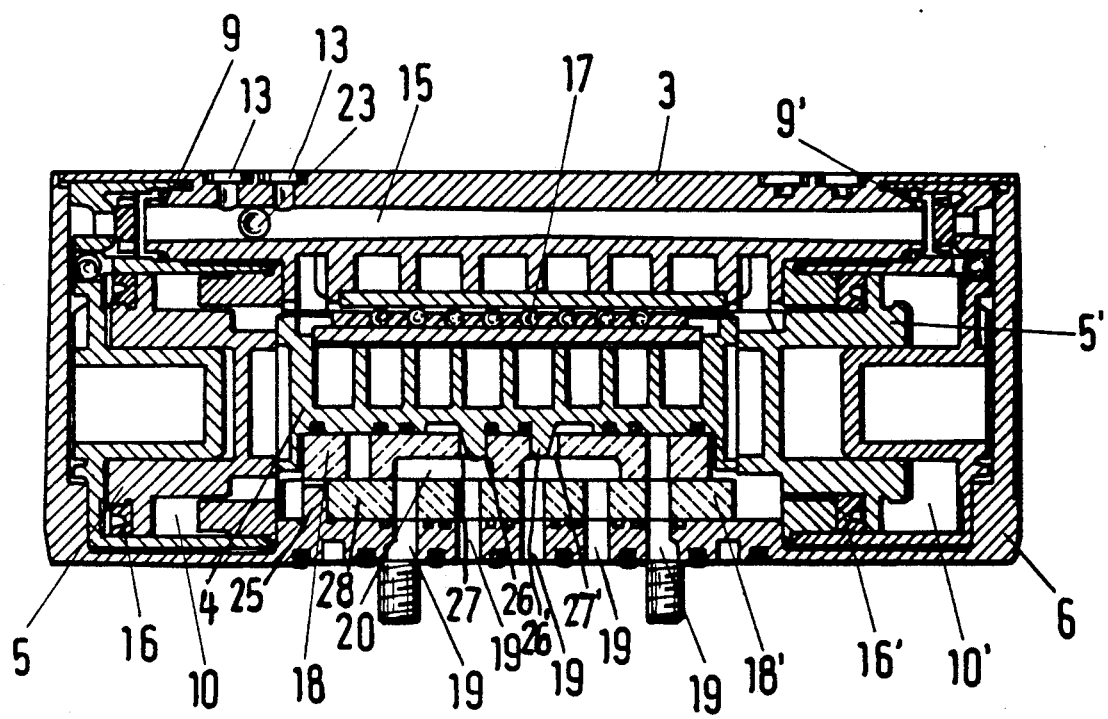
FIG 2 is a longitudinal section of a side view of the distributing valve of the present invention.

FIG. 2 shows a side view of the assembled valve in longitudinal section. The channel 15 provided in the cover connects or debouches (opens into a wider space) into the openings 13 and into the connecting sockets 9 and 9'. Between the openings 13, there is arranged a sealing element 23 which divides the channel 15 into two sections, for the activation of the cylinders 5 and 5'.

The actuating member 4 is provided with a ceramic plate 18 in which valve chambers 20 are integrated. The ceramic plate 18 is displaceably coupled with the actuating member 4 and, in this way, is moved by the corresponding movement of the actuating member 4. The plate 18' is stationary, i.e. it does not move with the actuating member 4, and is thus fixed in position with respect to the valve body 6. The ceramic plate 18 is held in fixed relation with respect to the actuating member 4 by the mechanical fit of the protrusions 26 into corresponding recesses 27, 27' in the ceramic plate 18. The ceramic plate 18' is held in fixed relation with respect to the valve body 6 by the fit of the protrusion 25 against an end 28 of the ceramic plate 18', and by other form fitting elements, not shown.

The position of the actuating member 4 and of the ceramic plate 18 and, thus, of the valve chamber 20 of the ceramic plate 18, with respect to the ISO standard gas connections 19, thus determine the switch position of the valve. The roller bed 17, which is arranged flush between cover 3 and actuating member 4 assures low-wear movement of the entire actuating member 4, and further allows for reduced friction and stiction between the cover 3 and the actuating member, while assuring proper pressure of the actuating member 4 and thus ceramic plate 18 against the ceramic plate 18' and thus valve body 6, when the modular distributing valve is assembled. The pistons 5 and 5', which are arranged on the two sides within the control housings 2, 2' guide the valve member 4 along its axis of movement. The sealing elements 16 and 16' surround the pistons 5 and 5' respectively and seal them off within the cylinder spaces 10 and 10' thus preventing a flow from the spaces 10 to the spaces 10', respectively on the medial and lateral aspect of the sealing elements 16 and 16'. The pressure differential in the cylinder spaces 10 and 10' provides a force for displacement of the actuating member, and thus for the transition of the valve from one state to another. Since the lateral cylinder spaces 10 are separated from the remainder of the valve structure by the sealing elements 16, 16', the pressure medium therein may be different from that being acted upon by the valve. The medial cylinder spaces 10', in another embodiment of the present invention, not shown, could also be sealed from the remainder of the valve space. Further, if the cylinder spaces 10, 10' were both sealed, a single control housing 2 with cylinder 5 fixed to the actuating member 4, supplied by either the opening 13 or 13', could be employed. However, the preferred embodiment employs a dual cylinder displacement system.

Figure 3:
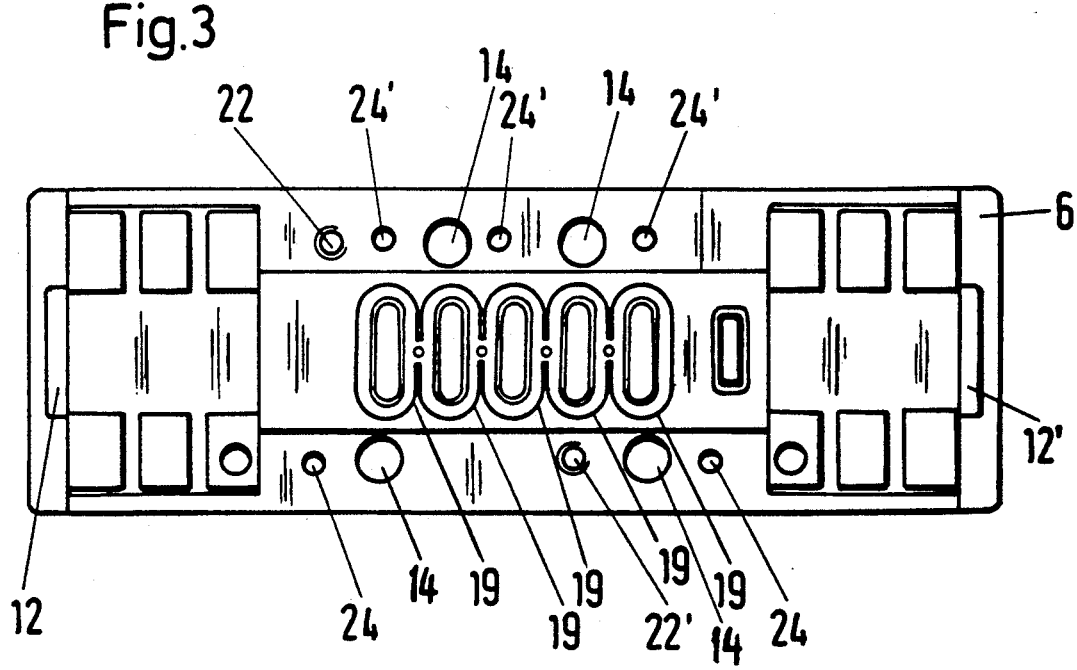
FIG. 3 is a top view of the open valve body of the present invention, with the cover removed.

FIG. 3 is a top view of the valve body 6. On the bottom of the tub-shaped valve body 6 there are arranged the ISO standard gas connection openings 19. The holes 14 are arranged in the thickened wall regions 29, 29' of the valve body in order to provide the necessary support there for fastening on ISO standard base plate, by known fastening means. The cutouts 12 and 12' are arranged centrally in the valve body 6 with respect to the longitudinal axis of the actuating member 4 of the valve, into which the control housings 2 and 2', which are of corresponding shape, may be inserted. This has the advantage that the two control housings 2, 2' can be made with a single die-casting mold, because they are identical or nearly identical.

Figure 4:
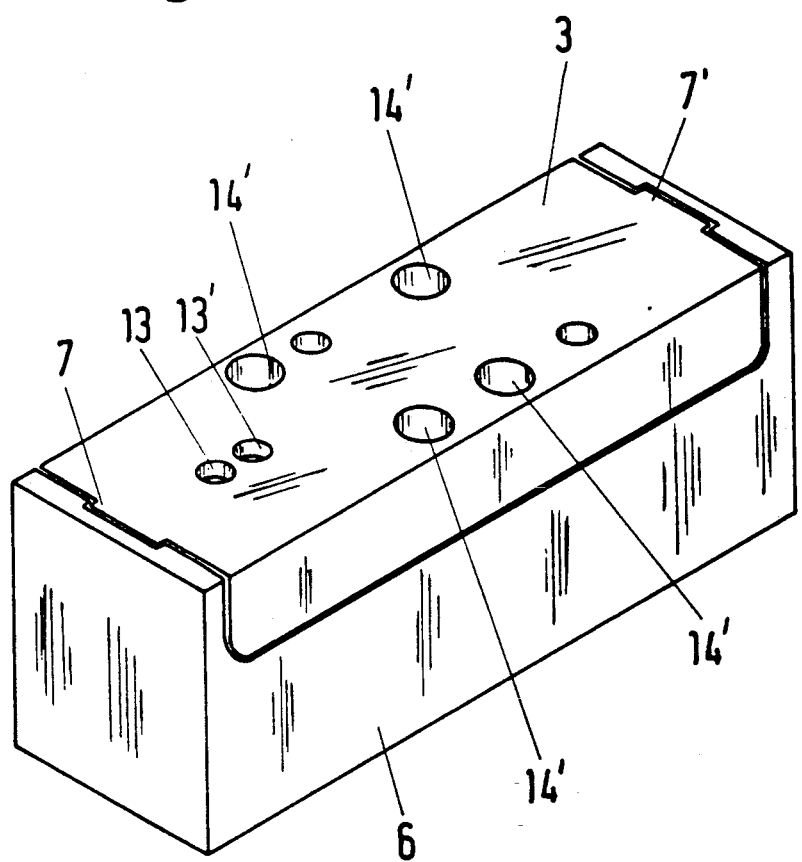
FIG. 4 is an isometric view of an assembled distributing valve of the present invention.

FIG. 4 shows the completely assembled valve, with all of the individual parts of the valve integrated in the tub-shaped valve body 6 and form a closed rectangular prism shaped contour. The cover 3 and the guide webs 7 and 7' rest flush and even. The holes 14' pass through the cover 3 and are aligned with the holes 14 of the valve body 6, which emerge on the bottom of the valve body 6 and thus make it possible to attach the valve to the ISO standard base plate through known fastening means.

In this way, the necessary tight closure is present on the corresponding surfaces. Only two additional screws, not shown, which are inserted in holes 22 and 22', passing through the cover 3 of the valve, are needed to assure the fastening of all individual parts of the valve.

It should be understood that the preferred embodiments and examples described are for illustrative purposes only and are not to be construed as limiting the scope of the present invention which is properly delineated only in the appended claims.

What is claimed is:

1. A modular distributing valve comprising:
   an essentially tub-shaped hollow valve body defining a space and having an open side, a bottom having gas connection ports, two side walls, two end walls and an axis;
   a flat cover, for covering the open side and enclosing the space of said hollow valve body;
   an actuating member, displaceably located within said valve body along said axis; and
   a pair of control housings disposed on said axis, each control housing comprising means for displacing said actuating member along said axis, said control housings being detachably connected to said cover, such that the control housings connected to said cover can be inserted together with said actuating member in said valve body from said open side of said hollow valve body and, after insertion of said control housings and said actuating member, said hollow valve body sealingly receives and fixes with a mechanical interference fit said control housings and said actuating member.

2. The distributing valve according to claim 1, further comprising a ceramic plate which is displaceably fixed with respect to said actuating member, said ceramic plate having valve chambers formed on the side facing said gas connection ports.

3. The distributing valve according to claim 1, wherein a seal between said actuating member and said valve body is formed from mating polished ceramic surfaces.

4. The distributing valve according to claim 1, further comprising aligned apertures extending through said cover and said valve body, through which fastening means may be inserted for fastening said distributing valve to an ISO standard base plate.

5. The distributing valve according to claim 1, wherein said cover comprises two ends, further comprising an a channel through which a fluid may pass, extending in said cover along an axis generally parallel to said axis of said valve body, which terminates at each of said ends of said cover in a connection socket which is adapted to detachably mount said pair of control housings said cover.

6. The distributing valve according to claim 5, further comprising a piston and an associated corresponding cylinder space formed in each of said pair of control housings wherein both of said cylinder spaces of said pair of control housings adapted to be connected to said channel through said connection sockets of said cover.

7. The distributing valve according to claim 6, wherein said pair of control housings further comprise an upper surface and said cover further comprises an upper surface, whereby when said pair of control housings and said cover are mounted in said valve body, said upper surface of said cover and said upper surfaces of each of said control housings are generally coplanar.

8. The distributing valve according to claim 1, wherein each of said pair of control housings further comprises a guide web aligned generally parallel to a direction of insertion into said valve body and said valve body has a pair of corresponding slots for flushly receiving said guide webs along said direction of insertion, so that said pair of control housings are guided into said valve body by said guide web and said corresponding slot during assembly of said distributing valve, and form a seal.

9. The distributing valve according to claim 1, further comprising a flat roller bearing disposed between said actuating member and said cover.

10. A modular distributing valve comprising:
    a hollow valve body defining a space and having an open side, a bottom having gas connection ports, two side walls, two end walls each having a guide recess and a longitudinal axis;
    a cover, for covering the open side and enclosing the space of said hollow valve body, having two ends and a channel through which a fluid may pass, extending in said cover along an axis generally parallel to said longitudinal axis of said valve body, which terminates at each of said ends of said cover in a connection socket;
    an actuating member, displaceably located within said valve body along said axis, adapted to be inserted through said open side into said hollow valve body;
    a pair of control means, dispose on said longitudinal axis, for displacing said actuating member along said longitudinal axis, each having a guide web and being adapted to be detachably connected to said cover by said connection sockets, said pair of control means being adapted to be inserted along a direction of insertion into the space of said hollow valve body from said open side with an interference fit between said guide webs and said guide recesses of said end walls to form a seal;
    a first ceramic plate which is displaceably fixed with respect to said actuating member, said ceramic plate having valve chambers formed on the side facing said gas connection ports;
    a second ceramic plate displaceably fixed with respect to said valve body, so that a seal is formed between said first ceramic plate fixed to said actuating member and said second ceramic plate fixed to said valve body from mating polished ceramic surfaces;
    a piston and an associated corresponding cylinder space in each of said pair of control means, wherein both of said cylinder spaces of said pair of control means are adapted to be connected to said channel through said connection sockets of said cover; and
    a flat roller bearing disposed between said actuating member and said cover, for reducing a sliding friction therebetween.

* * * * *